July 16, 1957 A. EISENHUT 2,799,274
VETERINARY EVACUATING PROBE FOR USE ON CATTLE
Filed Sept. 27, 1955 3 Sheets-Sheet 1
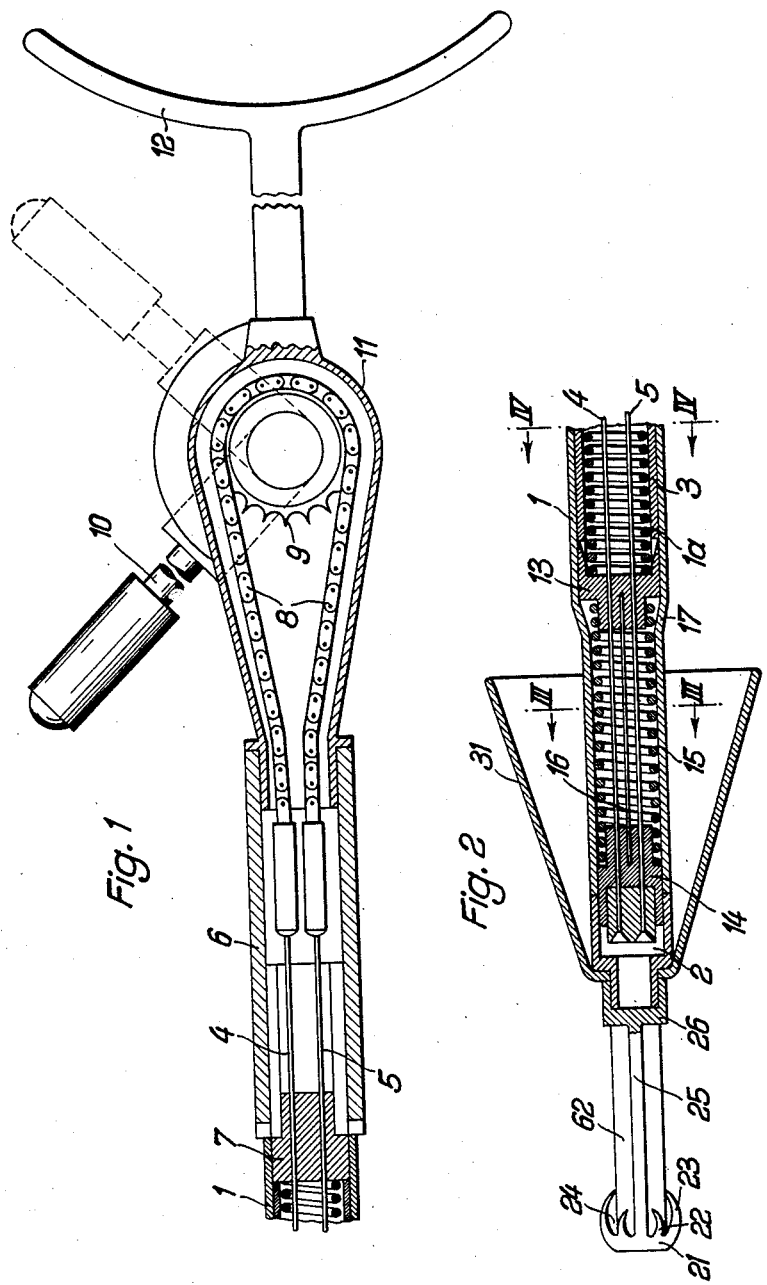
Inventor:
ARNOLD EISENHUT
ATTORNEY July 16, 1957  A. EISENHUT  2,799,274
VETERINARY EVACUATING PROBE FOR USE ON CATTLE
Filed Sept. 27, 1955  3 Sheets-Sheet 2
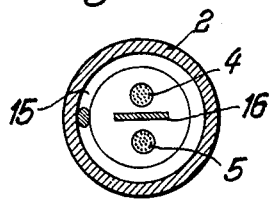
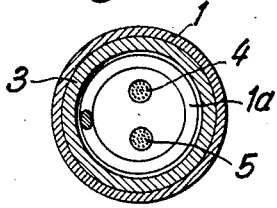
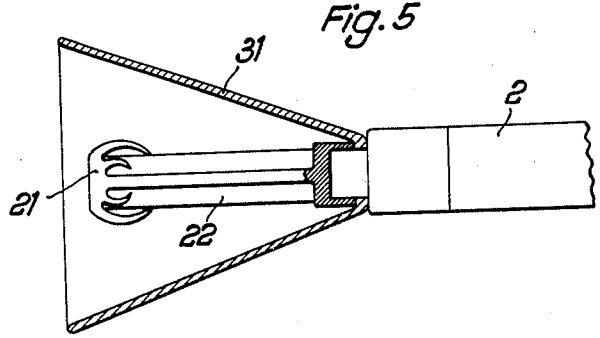
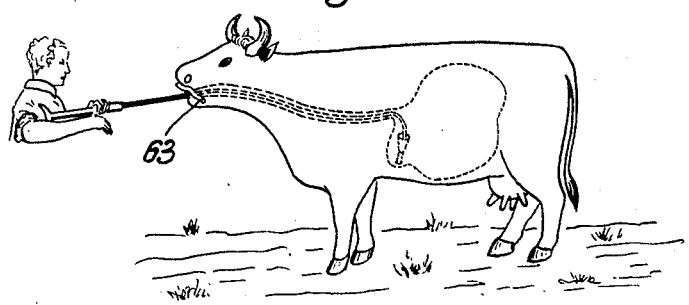
Inventor:
ARNOLD EISENHUT
ATTORNEY July 16, 1957 A. EISENHUT 2,799,274
VETERINARY EVACUATING PROBE FOR USE ON CATTLE
Filed Sept. 27, 1955 3 Sheets-Sheet 3
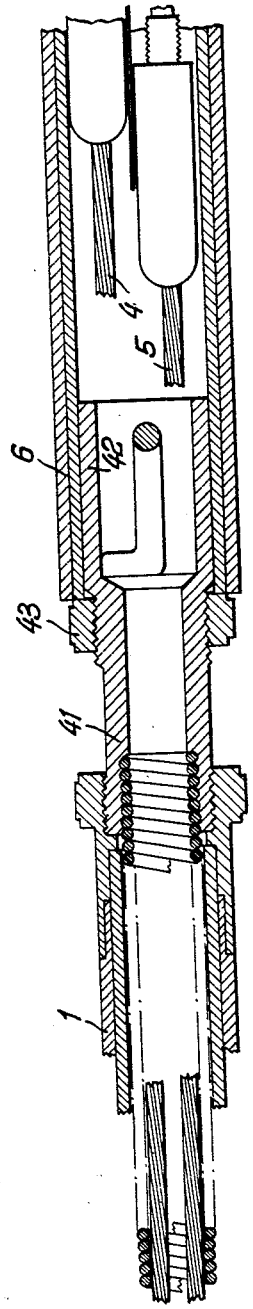
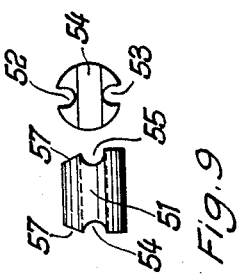
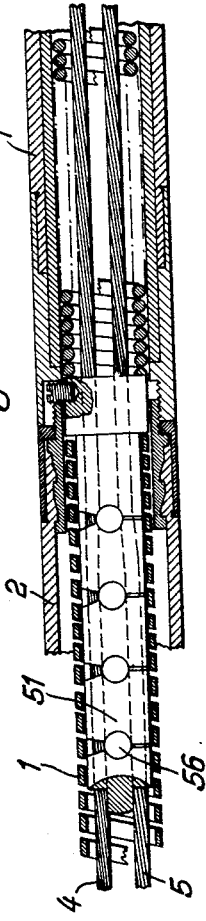
Inventor:
ARNOLD EISENHUT
ATTORNEY

United States Patent Office 2,799,274
Patented July 16, 1957

2,799,274

VETERINARY EVACUATING PROBE FOR USE ON CATTLE

Arnold Eisenhut, Basel, Switzerland

Application September 27, 1955, Serial No. 536,985

Claims priority, application Switzerland October 1, 1954

13 Claims. (Cl. 128—356)

This invention relates to a veterinary evacuating probe particularly for use on cattle and of the kind in which a long flexible member is passed through the pharynx and the esophagus of the animal into its stomach, or the rumen as would be the case with cattle, and by means of which pieces of metal can be located, picked up and extracted without the risk of injuring the animal.

These known evacuating or extricating probes are of very limited use. In particular, they do not allow of extracting solid bodies other than iron from the animal's stomach, nor is it possible with them to systematically search the stomach for strange bodies and to grasp and extract same.

The invention aims to provide an evacuating or extracting probe for cattle with which the animal's stomach can be readily and reliably searched and any solid bodies located, taken up and extracted, whether they be of ferrous or other material.

It is, therefore, one object of the invention so to devise the free end, or head piece, of the probe that with it the veterinary surgeon can "feel" all over the inside of the stomach without thereby hurting the animal and to take up any solids which he may locate in this way and to withdraw them, together with the probe, through the animal's mouth.

A further object of the invention is to provide a probe of which the end piece is movable somewhat like the end of an elephant's trunk by manipulation at the remote end of the probe which, however, should not be turnable about its own axis.

Another object of the invention is the provision of a dual control within the flexible tube which forms the major part of the probe, which will allow of the probe being so manipulated that its end piece will turn or tip in one direction only.

Still another object of the invention rests in the provision of a crab-like member at the extreme end of the end piece of the probe, between the arms of which foreign bodies in the stomach of the animal will be caught and retained until fully extracted.

Yet another object is the provision of a preferably permanent magnet within the said crab and a removabe fixture to hold the combined crab and magnet, such as a spring actuated bayonet joint, by means of which both parts may be removably fitted to the trunk-like end piece of the probe. This will enable the surgeon to attach and remove the parts quickly and to more easily clean them after use.

A still further object of the invention is the provision of means at the operative end of the probe which, when the probe is pulled out of the animal's mouth, will prevent any injury to the inside of the animal by hard objects between the arms of the crab.

The accompanying drawings diagrammatically illustrate a practical example of the invention. In these drawings Fig. 1 illustrates the outside end of the probe in longitudinal section.

Fig. 2 shows the inner or operative end of the probe also in longitudinal section.

Fig. 3 is a cross section on line III—III of Fig. 2 and Fig. 4 a similar section on line IV—IV of Fig. 2.

Fig. 5 represents the protective rubber hood for the operative end of the probe.

Fig. 6 indicates the function of the probe on an animal.

Fig. 7 is a longitudinal section through a part of the handle of the probe.

Fig. 8 is a similar section through a modified form of the trunk end.

Fig. 9 and Fig. 9a is a detail and shows one of the links used in Fig. 8 in side and front elevation.

As illustrated in Figs. 1 and 2 the probe comprises a flexible tube 1 which, however, is not turnable about its own axis, and the trunk 2 which is articulated to the end of tube 1 so as to bend in one plane only.

The flexible tube 1 may be constructed in various ways. It may, for instance, consist of a spirally wound wire 1a surrounded by an also flexible mantle 3. Two cables 4 and 5 are passed through the hollow tube 1, the outer ends of which are fixed to a chain 8 in the handle 6, 11 which is attached by means of a block 7 to the outside end of tube 1 which is the control end of the probe. The chain 8 is passed over a chain wheel or sprocket 9 in the sprocket casing 11 wherein it may be rotated by a hand lever 10 so that the cables become displaced in relation to each other. Preferably a body piece or rest 12 is arranged at the extreme end of the handle which the veterinary surgeon may place against his body or shoulder in order to facilitate handling the probe. Lever 10 and the body rest 12 are preferably removable so as not to obstruct packing for instance.

In the tube 1 of the probe a head piece 13 is arranged which at the same time serves as the root of the trunk 2. The cables 4 and 5 are fixed in the end piece 14 of the trunk, and arranged between the head piece 13 and the end piece 14 is an easily compressible spring 15. Furthermore, arranged between the two pieces 13 and 14 and fixed therein is a centrally positioned leaf spring 16, which prevents bending of the trunk by the cables 4 and 5 except in one plane, namely, the plane in which the spring itself flexes. The said leaf spring also sets up a resistance against compression of the spiral 15 in an axial direction by the pull of the cables.

The tube 1 and the trunk 2 are provided with preferably a common cover 17 through which the interior of the tube is hermetically sealed.

A crab 21 is detachably fitted, as by means of a bayonet joint (not shown) at the free end of the end piece 14 of the trunk 2, together with a preferably permanent magnet 62. The said crab has a plurality of arms or fangs 22, 23 of preferably different length, which are slightly bent and directed with their open ends toward the free end of the trunk, and between which wedged slots 24 are provided. The crab 21 is connected by bars 25 with its holder 26, and loosely arranged inside the crab and the bars 25 is the permanent magnet already referred to.

Also arranged at the free end of the trunk 2 is a funnel-shaped hood 31 of comparatively soft rubber. When the probe is introduced through the mouth of the animal, this hood turns back as shown in Fig. 2. When the probe, however, is pulled out of the animal's stomach, it turns over the crab and the magnet as shown in Fig. 5, in which position it protects the esophagus of the animal against foreign bodies which are being withdrawn from its stomach.

The handling of the probe can be gathered from Fig. 6.

A mouthpiece 63 of wood which, however, has no bearing on the invention, is inserted into the animal's mouth to prevent its biting the probe. Now the probe is introduced, whereby the veterinary surgeon may place the body rest against his body or shoulder. When the trunk at the end of the probe has reached the stomach, it is bent up by corresponding movements of the hand lever 10. By the bending of the trunk by means of lever 10 and by turning the trunk up about 90° to either side, the whole stomach of the animal, particularly its rumen where metallic parts normally settle, can systematically be searched for foreign bodies. When the stomach walls are being searched, or combined through so to speak, the same drawing or turning movements are carried out with the probe, in addition, being slightly moved forward and backward.

Prior to the pulling back of the probe the trunk is stretched again by corresponding movements of lever 10. With the entrance into the esophagus the funnel-shaped hood 31 turns over from the position of Fig. 2 into the position of Fig. 5 and thereby encloses the crab, the magnet, and any foreign bodies adhering thereto.

Regarding Figs. 1 and 2 it is to be noticed that the flexible tube 1, which in practice is very long, has been shown broken off, and that Fig. 2 is the continuation in axial direction of Fig. 1. In the modification of Fig. 7 only the manipulating end of the probe is shown including the handle portion 6 which is axially displaceable in relation to the tube 1 upon which it can be fixed in order to increase or relieve the cable tension as required.

For the latter purpose an intermediate socket 41 (Fig. 7) is screwed into the tube 1 at the manipulating end thereof. The said socket has an outer portion 42 upon which the handle portion 6 can be axially adjusted and secured in position by a lock nut 43. In the retracted position of the handle part 6 the cables 4 and 5 are tensioned. The position shown in Fig. 7 is one in which the trunk is bent up by a pull on one of the cables which can be seen from their position on the right hand end of the figure.

In the modified form of the invention as shown in Fig. 8 the leaf spring 16 (Fig. 2) has been replaced by consecutively arranged blocks 51. These blocks are cylindrical in cross section (Fig. 9a) and are provided with lateral grooves 52 and 53 for the passage of the cables 4 and 5, and with semi-cylindrical notches 54, 55 for the reception of the pivots 56. The end faces of the blocks 51 are chamfered or bevelled at one side of the median line as shown at 57. In this way the trunk can move only in one distinct plane, namely in that direction in which the said blocks are bevelled, which is toward the top in Fig. 8.

The invention is not intended to be limited by the example shown and described but may be modified in its component parts as might be required in each case without thereby deviating from the scope of the invention. It is possible, in one particular instance for example, to replace the permanent magnet shown and described by an electromagnet, the leads of which would conveniently be passed through the tube 1.

What I claim is:

1. In a veterinary evacuating probe for use particularly on cattle, having an end piece, means for tipping said end piece into angular position in relation to the probe and a permanent magnet in connection with the said end piece for detecting and evacuating ferrous material from the stomachs of cattle, a hollow tube to constitute the major part of the probe, means to prevent said tube from turning about its longitudinal axis, a trunk-like end piece at the free end of said probe, dual control members in said tube fixed to the said end piece so as to move same in an angular relation to the said tube, means in the said end piece to allow of such movement only in one plane, a handle at the remote end of the tube, and means in connection with said handle to cause the said end piece to tip in its plane of movement either to the right or to the left hand side of the probe.

2. In a veterinary evacuating probe for use particularly on cattle, having an end piece, means for tipping said end piece into angular position in relation to the probe and a permanent magnet in connection with the said end piece for detecting and evacuating ferrous material from the stomachs of cattle, a hollow flexible tube to constitute the major part of the probe, means to prevent said tube from turning about its longitudinal axis, a trunk-like end piece at the free end of said probe, two control cables in said tube fixed each with one end to the said end piece for tipping same in angular relation to the said tube, a hollow handle at the remote end of the probe, a chain wheel in the said handle turnable on an axle pin which extends to the outside of the said handle, a chain capable of limited movement on said chain wheel and having its ends fixed each to one of said control cables, a lever on the outside end of said axle pin for turning said chain wheel and thereby moving said cables in mutually opposing directions, and a member flexible only in one plane in said end piece and positioned between the said cables so as to allow of the tipping of the said end pieces only in its own plane of flexibility.

3. In a veterinary evacuating probe for use particularly on cattle, having an end piece and means for tipping said end piece into an angular position in relation to the probe, a hollow flexible tube, a trunk-like end piece attached to the free end of the said tube, dual control members in the said tube for tipping said end piece in relation to the said probe, means in the said end piece for allowing its tipping in only one plane of movement, and a crab at the end of the said end piece for detecting, seizing and holding foreign bodies between its arms.

4. In a veterinary evacuating probe for use particularly on cattle, having an end piece and means for tipping said end piece into an angular position in relation to the probe, a permanent magnet in connection with said end piece and a crab at the end of said end piece having a plurality of scraping arms and wedge-shaped spaces between said arms by means of which to extricate foreign bodies which have become difficult of removal.

5. In a veterinary evacuating probe for use on cattle, having an end piece adapted to enter the stomach of the animal and to be tipped therein into angular position in relation to the said probe, a flexible tube, an end piece attached to the end of said flexible tube, a crab at the end of said end piece having a plurality of scraping arms and wedge-shaped spaces between said arms by means of which to extricate foreign bodies which have settled in the walls of the animal's stomach, and a magnet in the said end piece intermediate the end of the said flexible tube and the said crab.

6. In a veterinary evacuating probe for use on cattle as set forth in claim 5, in which a flexible member is provided in the said end piece which allows of the said end piece tipping only in its own plane of flexibility.

7. In a veterinary evacuating probe for use particularly on cattle as set forth in claim 3, in which the said crab is fixed to the said end piece by means of a spring-controlled bayonet joint.

8. In a veterinary evacuating probe for use on cattle, having an end piece adapted to enter the stomach of an animal, and means for tipping said end piece into an angular position in relation to the said probe within the stomach of the animal, a hollow flexible tube, a trunk-like end piece attached to the free end of the said tube, dual control members in the said tube for tipping said end piece in relation to the said tube, means in the said end piece for allowing its tipping in only one plane of movement, and a crab at the end of said end piece of substantially part-spherical formation with wedge-shaped pointed arms of different length and slightly bent form and inversely wedge-shaped seizing grooves between the said arms.

9. In a veterinary evacuating probe for use on cattle, having an end piece adapted to enter the stomach of an animal, and means for tipping said end piece into an angular position in relation to the said probe within the stomach of the animal, a hollow flexible tube, a trunk-like end piece attached to the free end of the said tube, dual control members in the said tube for tipping said end piece in relation to the said tube, means in the said end piece for allowing its tipping in only one plane of movement, a crab removably attached at the end of said end piece, wedge-shaped and slightly curved arms on the said crab, said arms being pointed and of different length, and a funnel-shaped hood of elastic material on said end piece adapted to be turned over the end piece in the direction of the tube when the probe is introduced into the esophagus of the animal but to turn forward over the said crab when the probe is being removed out of the animal's stomach.

10. In a veterinary evacuating probe for use particularly on cattle, a flexible tube to constitute the major part of said probe, a trunk-shaped end piece to the said tube, means for tipping said end piece into an angular position in relation to the said tube, a spiral to line the inside wall of the said end piece, a block at the inner and a block at the outer end of the said end piece, and a leaf spring intermediate the said blocks to allow of the said end piece tipping in one plane of movement only.

11. A veterinary evacuating probe as set forth in claim 10, in which the said spiral and leaf spring are replaced by a plurality of hinged cylindrical block members having their faces at one side of their median line flat and on the other side bevelled so as to allow the bending of the said end piece only in the plane of their bevelled ends.

12. A veterinary evacuating probe as set forth in claim 2, in which the handle portion of the probe carrying the chain and chain wheel for moving the said control cables is adjustable in relation to the tubular part of the probe.

13. In a veterinary evacuating probe for use on cattle, having an end piece adapted to enter the stomach of an animal, and means for tipping said end piece inside the stomach in relation to the probe, a hollow flexible tube, a trunk-like end piece at the free end of said tube, dual control members in the said tube for tipping said end piece, means in said end piece to allow of tipping same in one plane of tipping movement only, a handle at the remote end of the said tube, external means in connection with said handle for tipping said end piece by the said dual control members, and a body rest on the said handle to permit the user of the probe to rest the handle end of the probe against his body while operating the tipping means in connection wtih the said handle.

References Cited in the file of this patent

UNITED STATES PATENTS

| | | |
|---|---|---|
| 2,095,976 | Foreman | July 14, 1936 |
| 2,753,870 | Muffly | July 10, 1956 |

FOREIGN PATENTS

| | | |
|---|---|---|
| 1,063,457 | France | Dec. 16, 1953 |